Nov. 30, 1965   F. R. BRANDT ETAL   3,221,189
CERAMIC RUGGEDIZED LOW FREQUENCY CRYSTAL UNIT
Filed June 3, 1963   3 Sheets-Sheet 1

INVENTORS
FRANKLIN R. BRANDT
ANDRE J. DE GLAS
CHARLES W. MANN

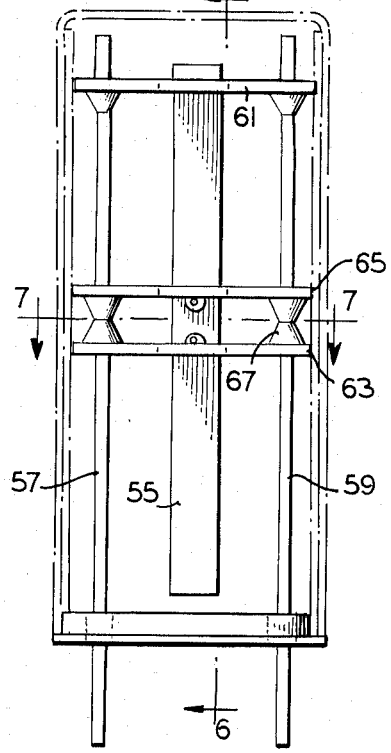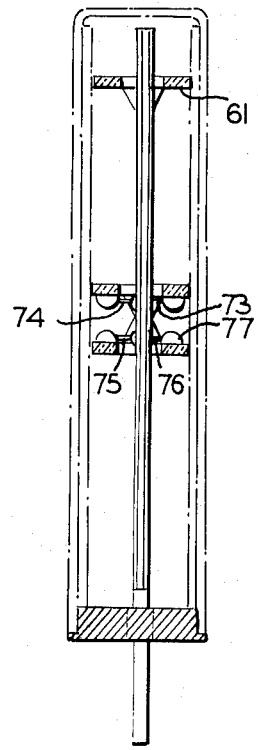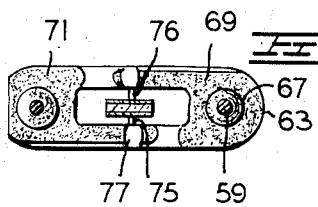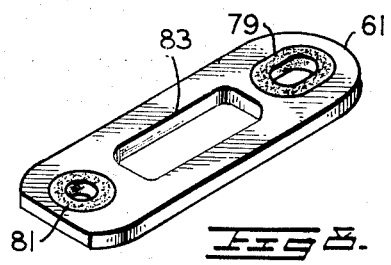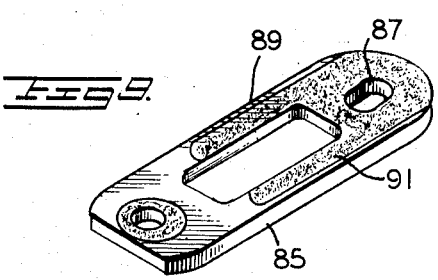
INVENTORS
FRANKLIN R. BRANDT
ANDRE J. DE GLAS
CHARLES W. MANN

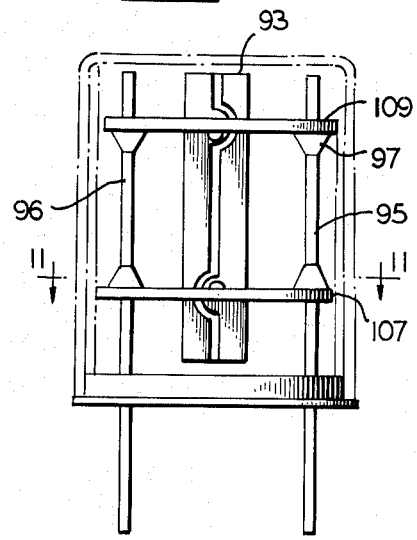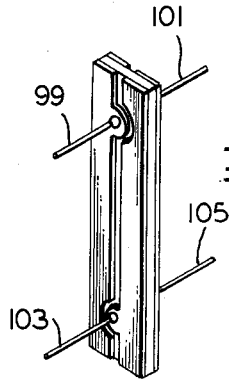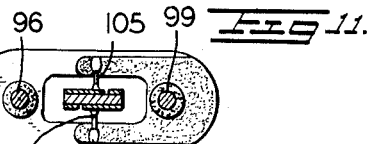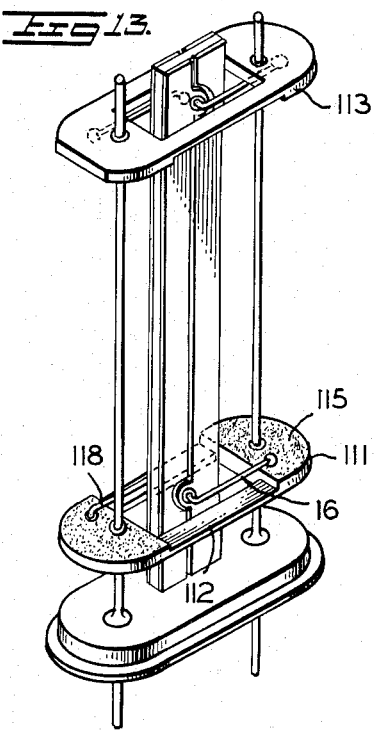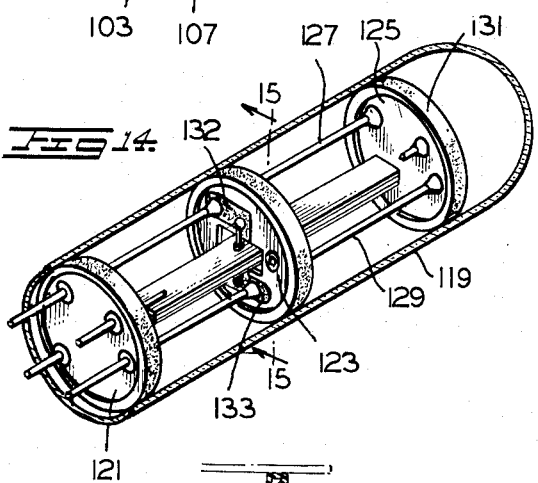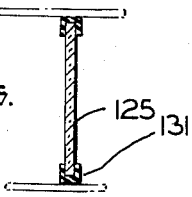
INVENTORS
FRANKLIN R. BRANDT
ANDRE J. DE GLAS
CHARLES W. MANN

United States Patent Office 3,221,189
Patented Nov. 30, 1965

3,221,189
CERAMIC RUGGEDIZED LOW FREQUENCY CRYSTAL UNIT
Franklin R. Brandt, Andre J. De Glas, and Charles W. Mann, Carlisle, Pa., assignors to Dynamics Corporation of America, New York, N.Y., a corporation of New York
Filed June 3, 1963, Ser. No. 284,986
13 Claims. (Cl. 310—9.1)

This invention relates broadly to piezoelectric crystal units and more particularly to a ruggedized crystal mount for low frequency units.

In the construction of crystal units there has been a constant effort to improve the electrical characteristics of the particular crystals used for various purposes. However, in recent years it has also become mandatory to provide crystal unit mounts which are very rugged in character and are able to withstand high acceleration and vibration stresses due to the environment in which they are used. The basic problem is to attain maximum ruggedization without disturbing the precise electrical characteristics of the unit.

Most of the crystal units use some form of spacer which is designed to hold the supporting structures in place rigidly within the mount itself. One of the standard means in use today is made from mica which, while proving satisfactory under ecrtain circumstances, has a tendency to crack under excessive stress. Spacers molded from polytetrafluoroethylene resin have also been used but they have a tendency to warp and thus distort the crystal mount.

Additionally, the crystal is supported and electrically connected by means of fine wires betwen the post support structures themselves which provide a flimsy mount as far as the crystal vibrating plate itself is concerned.

Accordingly, an object of the present invention is to provide an improved ruggedized crystal mount for low frequency units.

A further object of this invention is to provide crystal mounts using ceramic spacers.

A still further object of this invention is to provide crystal mounts using ceramic spacers with electrically conductive coatings thereon.

Another object of this invention is to provide crystal mounts which are spaced from the housing in which they are mounted by means of resilient chemically inert materials.

Yet another object of this invention is to provide crystal mounts using ceramic spacers with electrically conductive coatings thereon so that the crystal may be supported by electrical connections directly between the ceramic spacers and the crystal electrodes.

These and other objects will become evident from the following description when taken in conjunction with the drawings wherein:

FIG. 5 is an elevational view of a support using multiple spacers;

FIG. 6 is a sectional view taken along lines 6—6 of FIG. 5;

FIG. 7 is a sectional view taken along the lines 7—7 of FIG. 5;

FIGS. 8 and 9 are perspective views of modified forms of the spacers;

FIG. 10 is an elevational view of a further type of crystal support employing the present invention;

FIG. 11 is a sectional view taken along lines 11—11 of FIG. 10;

FIG. 12 is a partial showing of the crystal unit and leads used in FIG. 10;

FIG. 13 is a modified view of the mounting using the present invention;

FIG. 14 is a modified form of the present invention mounted in a glass envelope; and FIG. 15 is a sectional view taken through the lines 15—15 of FIG. 14 showing the circular ceramic disc.

Broadly speaking, the present invention provides a crystal mount which uses ceramic spacers wherein said spacers may have slotted central openings therein through which the crystal may extend. The ceramic spacer further has a conductive coating thereon and the support means of the crystal extends directly between the crystal electrode and the conductive coating thereby additionally providing the necessary electrical connections.

Figure 1:
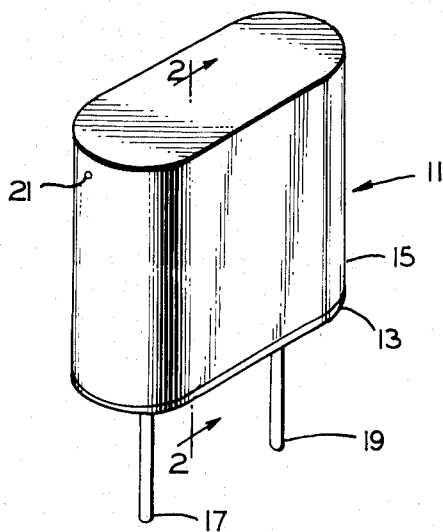
FIG. 1 shows one form of crystal housing using the present invention.

Turning now more specifically to the drawings, FIG. 1 illustrates one specific type of crystal holder 11 having a base 13, a metallic housing 15 and the electrical leads 17 and 19 extending through the base. Also shown is the bleed hole 21 whereby the housing may be evacuated after the crystal is in its place.

Figure 3:
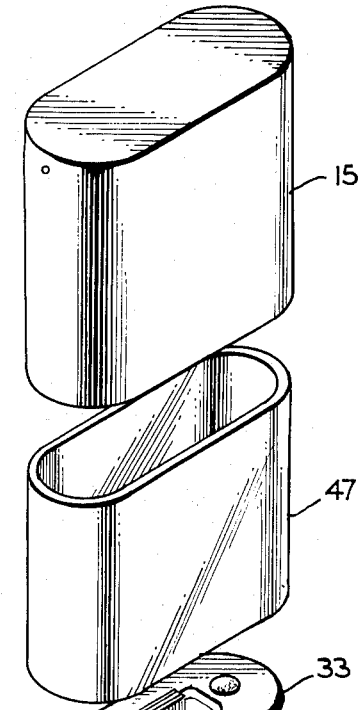
FIG. 3 is an exploded view of the unit of FIG. 1.
Figure 2:
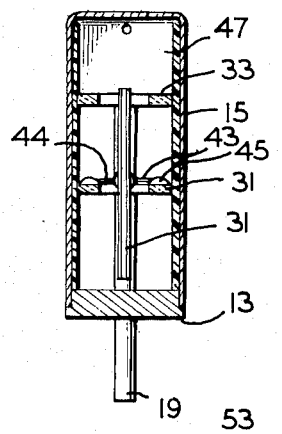
FIG. 2 is a sectional view taken through lines 2—2 of FIG. 1.

FIGS. 2 and 3 illustrate the relative positions of this particular form of the invention. The electrical leads 17 and 19 extend upwardly through the base 13 passing through apertures 27 and 29. The leads are secured within the apertures by means of any well known dielectric sealing means. The leads extend upwardly and provide support post members 23 and 25.

Ceramic spacers 33 and 35 are secured to the support posts 23 and 25 at the point where the post passes through the apertures in the spacers. The spacers are soldered to the posts as will be more thoroughly discussed as the description proceeds. Upper spacer 33 merely acts as a solidifying and ruggedizing member for the mount itself.

However, spacer 31 has electrically conductive coatings 37 and 39 thereon. These electrically conductive coatings may be applied in any manner. However, it has been found that an electrically conductive silver paste fired on at about 1400° F. has proven to be a very satisfactory manner for providing the necessary coating.

Figure 4:
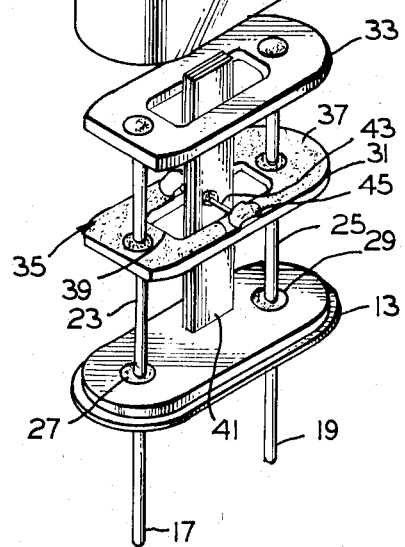
FIG. 4 is a perspective view of one of the spacers of the present invention.
Figure 4:
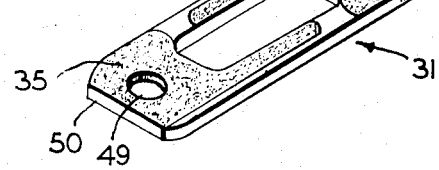

In the particular crystal unit of FIGS. 1, 2 and 3, the coatings 35 and 37 are applied as more closely illustrated in FIG. 4. With the two conductive coatings 35 and 37 the necessary leads 43 and 44 extend outwardly from the nodal points on the opposite sides of the crystal where they are normally soldered to the electrodes of the crystal and the leads are subsequently soldered to opposite conductive coatings.

Accordingly, the leads have been shortened and have been mounted directly to the spacers, thus giving an extreme increase in ruggedization of the unit while still maintaining the necessary connections between the posts and the leads.

Although it has been found that the use of ceramic spacers per se has greatly enhanced the ability of the unit to withstand shock and vibration, it has further been established that by rounding the corners 53 of the slot 39, the ceramic spacers will have less tendency to crack than with a normal square corner slot.

It is further noted that one of the two apertures 49 and 51 is elongated rather than perfectly round. By providing this elongated aperture 51 we have eliminated the necessity of precise alignment of the support members 23 and 25, thus much simplifying the assembly techniques of the unit itself. It should also be noted that the electrically conductive film extends down into the apertures 49 and 51 in order to assure a good contact between the support post members and the spacer where the solder is applied.

In effect, this ceramic spacer provides a very rigid support, raises the natural mechanical resonant frequency of the crystal mount thus improving resistance to vibration, and stiffens or limits the movement of the crystal mount at its natural resonant point, thus reducing the tendency to tear itself apart during vibration. The particular spacer shown in FIG. 4 is applicable to any crystal which will fit the rectangular hole and has its nodal point at its center, such as +5° X extensional or E element, CT or DT cut crystal, sometimes called C and D elements, MT or M element crystals, and the newly developed SL cut crystal. The use of this spacer further eliminates the need for any wire resonant damping weights as are normally now used in mounting these types of crystals.

It will be noted that the spacer is cut short at one end 50 thereof. It is common practice in the art to solder the housing to the base with the housing being previously dimpled as at 21. This dimple is filled with solder and the housing and the solder are pierced with a bleeder hole. The assembled housing, base and enclosed crystal assembly is then placed in a vacuum system where the entrapped air is pumped out and the solder over the dimple is melted to hermetically seal the pierced hole, thus producing the hermetically sealed evacuated holder. Additionally, the unit after being evacuated of air may be back filled with a dry inert gas at atmospheric pressure, with commonly used gases being helium or nitrogen.

The dimple in the metal can is usually located as shown in FIG. 1 but may also be located at the middle of the edge of the can or even sometimes near the base itself. In any event, the end of the ceramic spacer is cut short to enable the dimple to pass the spacer freely into the housing.

A liner 47 made of a chemically inert material, such as that sold under the trademark Teflon, may be employed within the housing in order to produce a more snug fit of the caged crystal assembly, thereby providing additional ruggedization against shock and vibration and also preventing the metal coating on the spacers and the crystal support wire ends from short circuiting to the metal housing. Although this line is not shown in any of the remaining figures, it is to be understood that it may be used with any crystal mount using a metal housing.

FIGS. 5, 6 and 7 illustrate the use of a combination of two closely spaced ceramic spacers for additional ruggedization of long crystal plates having center nodal points such as a long, low frequency +5° X extensional plate (E element). As shown, the E element crystal 55 is mounted centrally by the two spacers 63 and 65 which are soldered at 67 to the support members 57 and 59. The lead wires 73, 74, 75 and 76 extend outwardly from the crystal electrode and are soldered to the fired-on silver coating 69 and 71 in a manner similar to that discussed in connection with the crystal of FIGS. 1–3. The use of these two spacers increases the ability of the unit to withstand vibration and shock.

FIG. 8 shows a ceramic spacer which may be used as the upper spacer member 61 of FIG. 5. In this particular spacer, the only metallic coating necessary is around the apertures at 79 and 81. This coating is necessary in order that the support members may be soldered to the spacer itself. Since there are no electrical connections between the crystal and spacer 61, there is no need to have the extended electrically conductive coatings. Since the crystal passes centrally through spacer 61, it is necessary to have a slot centrally located therein. However, if the crystal is so mounted that the upper spacer is supported above the crystal itself, then a ceramic spacer without a center slot 83 may be used in order to obtain increased ruggedization.

FIG. 9 is another specific illustration of a spacer coated in a different manner for use with a flexural vibrating crystal wherein the lead wires are connected to the nodal points of the crystal at .224 times the length from each end of the crystal. Accordingly, the electrically conductive coating extends on either side of the slot from the same aperture 87.

FIGS. 10, 11 and 12 illustrate a specific mounting for this type of crystal. This type of support may be used for N elements, H elements, J elements and X-Y flexure bars.

Again, the support post members 95 and 96 extend upwardly from the base and the spacers 107 and 109 are soldered to the posts. The leads 99, 101, 103 and 105 extend outwardly to contact a respective conductive coating and are soldered thereto. In addition to all the advantages listed above, straight split N and H units are more easily and rigidly mounted through the use of the present invention.

It should be noted that the flexural unit disclosed in FIGS. 10–12 requires, in effect, one right and one left hand conducting spacer which simply reverse the two extending legs onto the opposite side of the spacer itself.

Under certain applications, particularly down to very low frequencies, it may be necessary to have the crystal mounting wire free for a longer length than is provided by connecting it directly from the electrode crystal plate to the ceramic spacer. This particular application is illustrated in FIG. 13 wherein the spacer 11 has a step 112 adjacent to the length of the slot. Both ends of the spacer are then coated with the electrically conductive coating and the longer lead wires 116 and 118 extend from the nodal point to the outer ends of the spacer. Thus, we have provided a mounting as disclosed in FIG. 13 using two spacers, 111 and 113, and additionally provided the longer crystal lead wires.

FIG. 14 illustrates the use of the present invention in glass envelopes. Here, the spacers 121, 123, 125 are rounded and the normal four post support members pass through the spacers. However, only two of the posts, such as 127 and 129, form the actual electrical connections. One of the support posts is shown as broken away for purposes of clarity. Again, the points at which the support posts pass through the spacers have a metallic coating around the apertures in the spacers in order that the support members may be soldered securely to the spacers.

Electrically conductive coatings 131 and 133 may take the form as shown and, again, the lead wires from the nodal point of the crystal extend directly to the electrically conductive coatings.

In the present case, rather than using the liner that is used with the metal cans, a resilient chemically inert rim 131 such as Teflon, may be placed around each of the spacers, as illustrated in FIG. 15. It should be noted that a width-length flexure or a thickness-length flexure crystal would require an additional disc with the two discs located .224 times the length of the crystal plate from each end of the crystal plate.

It is to be understood that the present disclosure relates to specific examples and is not to be considered limiting in any manner. The particular slots through the ceramic spacers could, of course, have different shapes according to any specific requirements. The following is a list of crystals which may be mounted on the ceramic spacers or discs.

| Crystal | | No. Wires | Type of Vibration | Modern Terminology |
|---|---|---|---|---|
| CT | Square | 2 | Face Flexure | C Element. |
| CT | Round | 2 | do | Do. |
| DT | Square | 2 | do | D Element. |
| DT | Round | 2 | do | Do. |
| +5° X | Center Mounted Long Plate. | 2 or 4 | Extensional | E Element. |
| MT | do | 2 or 4 | do | M Element. |
| NT | Straight Split | 4 | Width-Length Flexure. | N Element. |
| NT | L Split | 4 | do | Do. |
| +5° X | Straight Split | 4 | do | H Element. |
| +5° X | L Split | 4 | do | Do. |
| Duplex | (Sometimes Called JT). | 4 | Thickness-Length Flexure. | J Element. |
| X-Y | Long, Approx. Square Cross Section, +5° X Bar. | 4 | do | None. |
| X-Y |  | 4 | Width-Length Flexure. | Do. |
| SL | (Newest Cut) | 2 or 4 | do | Do. |

We claim:
1. A low frequency piezoelectric unit comprising a base, a plurality of support members extending upwardly from said base, at least one ceramic spacer having a slot substantially centrally therethrough, a plurality of apertures equal in number to said support members, and spaced circumferentially near the outer edge of said ceramic spacer, said support members extending through said apertures, an electrically conductive coating on said ceramic spacer extending from at least one of said apertures to the edge of said slot, a piezoelectric crystal unit extending through said slot, conductive leads connected between the nodal points of said crystal unit and said electrically conductive coating, and a sealed housing enclosing said unit.

2. The apparatus of claim 1 wherein said slot is of rectangular shape and the corners of said slot are rounded.

3. The apparatus of claim 1 further comrising a resilient chemically inert liner between said unit and said housing.

4. The apparatus of claim 1 further comprising a resilient chemically inert rim about the edge of said ceramic spacer.

5. The apparatus of claim 1 further comrising a ceramic spacer mounted near the free ends of said support members.

6. The apparatus of claim 1 wherein at least one of said apertures is elongated.

7. In a low frequency piezoelectric unit including a crystal, a base, vertical support members extending from said base and a housing; a spacer comprising a substantially flat ceramic plate, a slot extending through said plate, a plurality of apertures through said plate, said apertures being circumferentially spaced about the outer edge of said plate, said support members extending through said apertures, means for securing said support members to said plate at said apertures, an electrically conductive coating on said ceramic plate extending from at least one of said apertures to the edge of said slot, and leads connected between the nodal points of said crystal and said conductive coating on said ceramic plate.

8. The apparatus of claim 7 further comprising a resilient chemically inert means between said ceramic plate and said housing.

9. The apparatus of claim 7 wherein said slot is of rectangular shape with rounded corners.

10. The apparatus of claim 7 wherein at least one of said apertures is elongated.

11. In a low frequency piezoelectric unit including a crystal, a base, a header and a housing, a ruggedized mounting comprising a plurality of supporting members extending upwardly from said base, said crystal being mounted between said support members, at least one substantially flat ceramic spacer, a slot centrally located in said spacer through which said crystal may pass, a step in said spacer adjacent to said slot on either side thereof, apertures through said spacer located about the periphery thereof, an electrically conductive coating on spacer extending from at least one of said apertures, said support members passing through said apertures, leads connected between the nodal points of said crystal and said conductive coating, and means for securing said members to said spacer at the point where they pass through said apertures.

12. The apparatus of claim 8 wherein said chemically inert means forms a rim about said spacer.

13. The apparatus of claim 8 wherein the electrically conductive coating extends into said associated aperture.

References Cited by the Examiner
UNITED STATES PATENTS

| | | | |
|---|---|---|---|
| 2,785,321 | 3/1957 | Imler | 310—9.1 |
| 2,965,773 | 12/1960 | Hill | 310—9.1 |
| 3,046,423 | 7/1962 | Wolfskill et al. | 310—9.1 |

ORIS L. RADER, *Primary Examiner.*

MILTON O. HIRSHFIELD, *Examiner.*